United States Patent [19]

Kobelt

[11] Patent Number: 4,572,335
[45] Date of Patent: Feb. 25, 1986

[54] BRAKE ACTUATING SYSTEM

[76] Inventor: Jacob Kobelt, 6110 Oak St., Vancouver, British Columbia, Canada, V6M 2W2

[21] Appl. No.: 474,494

[22] Filed: Mar. 11, 1983

[51] Int. Cl.[4] .................. F16D 55/08; F16D 55/16
[52] U.S. Cl. ................................ 188/72.1; 91/384; 188/72.7; 303/40
[58] Field of Search .............. 188/72.1, 72.7, 28, 188/136, 151 R, 343, 72.4, 370; 91/384, 374, 461; 303/40, 46, 114

[56] References Cited

U.S. PATENT DOCUMENTS

| | | | |
|---|---|---|---|
| 1,846,081 | 2/1932 | Berry | 91/384 X |
| 2,038,608 | 4/1936 | Sauzedde | 188/72.7 X |
| 2,162,775 | 6/1939 | Dick | 188/343 X |
| 2,888,029 | 5/1959 | Govan et al. | 91/384 X |
| 3,228,493 | 1/1966 | Kershner | 188/72.7 |
| 3,589,481 | 6/1971 | Motsch | 188/370 X |
| 3,633,715 | 1/1972 | Burnett | 188/72.4 X |
| 3,690,737 | 9/1972 | Neese et al. | 303/114 |
| 3,946,837 | 3/1976 | Houser | 188/72.4 |
| 3,986,584 | 10/1976 | Wright et al. | 188/72.7 X |
| 3,996,840 | 12/1976 | Futamata et al. | 91/461 X |
| 4,325,471 | 4/1982 | Schuster | 188/72.4 X |

Primary Examiner—Douglas C. Butler
Assistant Examiner—Robert J. Oberleitner
Attorney, Agent, or Firm—Carver & Co.

[57] ABSTRACT

A brake actuating system for use with a brake assembly having a body, a brake actuator and at least one friction member cooperating with the actuator and the body to brake a brakeable member. The invention provides a system with improved operator "feel" of braking force, and has a first fluid valve receiving pressurized fluid and controlling actuation of the actuator, with a signal input adapted to receive a signal from an operator and to be responsive to extension of the actuator. In this way, a change in brake signal from the operator produces a corresponding change of extension of the actuator which produces a corresponding change in fluid output signal to the actuator. In a first embodiment, a second fluid valve has an input receiving pressurized fluid, an output port adapted to communicate with the actuator fluid input, and a pilot pressure input port communicating with the fluid output of the first valve such that a change in pilot pressure from the first valve as a result of change in brake signal from an operator changes the output from the second valve and also changes the input signal to the brake actuator. In a second embodiment, an alternative first fluid valve only is used and the fluid output therefrom communicates directly with fluid input of the actuator. Further alternative embodiments reduce effects of friction in a control cable by providing a direct feedback of actuator force on a control lever, and also permit locking of the lever.

15 Claims, 4 Drawing Figures

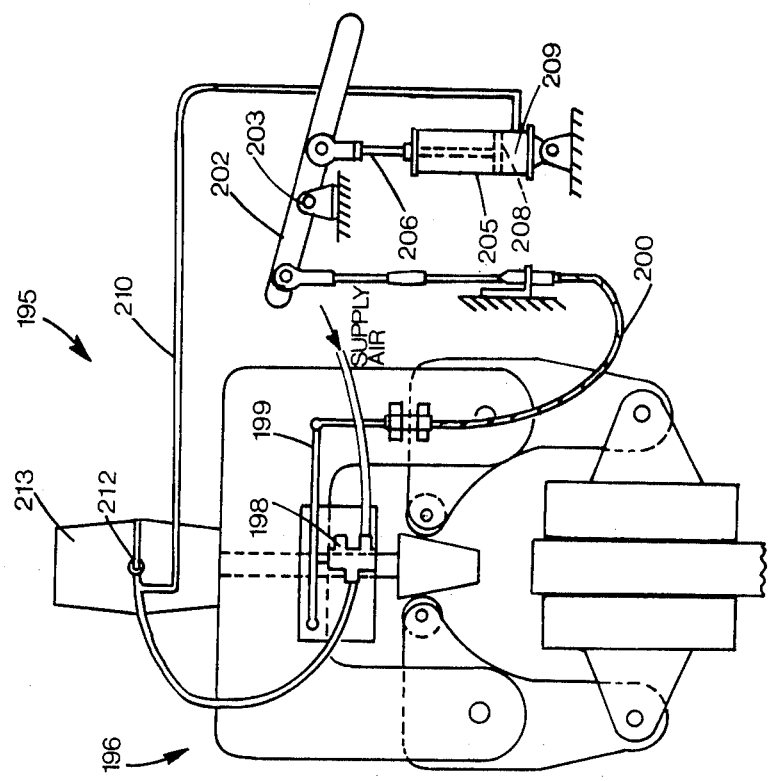
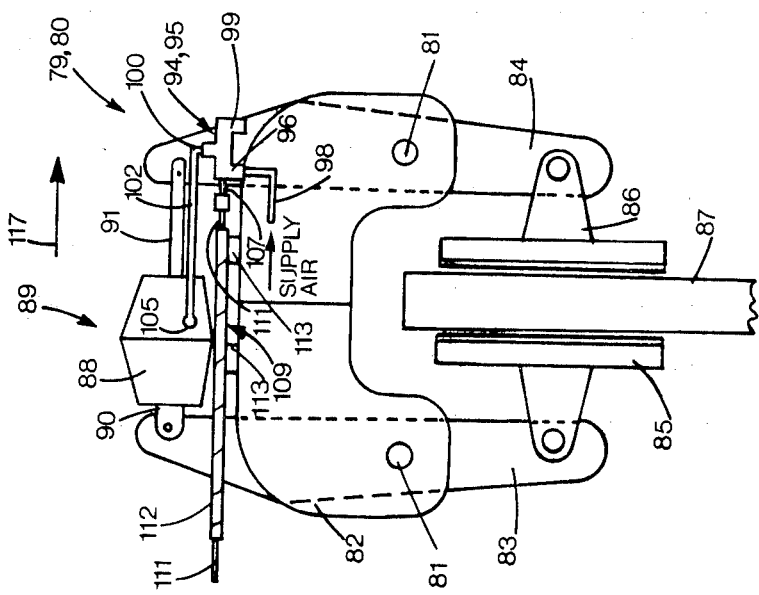

BRAKE ACTUATING SYSTEM

BACKGROUND OF THE INVENTION

1. Field of the Invention

The invention relates to a brake actuating system, particularly for heavy duty full power or power assist fluid actuated caliper brakes as used in industrial and marine applications.

2. Prior Art

Heavy duty caliper brakes are commonly fluid actuated by an extensible and retractable brake actuator. The fluid commonly used is air, which is metered by an operator through a compensating regulator valve. Output from the valve is proportional to movement of a manual lever which controls a signal input rod of the valve, the output being metered air from a pressurized fluid source, which output is fed to a spring return actuator or similar device. Because the operator is metering a valve controlling the pressurized fluid, he has no "feel" of his braking signal or braking force, and consequently the brake is sometimes applied too quickly, with a corresponding excessive loading of the system being braked, or too slowly which consequently requires an excessively long time for the device to be braked. In one industrial application, namely draw works as used in oil well drilling wherein a string of drill rods is lowered down a bore hole, accurate "feel" of the braking signal or force is necessary so as to reduce shock loads on the string of drill rods and the braking system. In the past, accidents have occurred resulting from applying brakes too rapidly due to difficulties in feeling the amount of braking force being applied. Also, some prior art brakes cannot be left unattended when engaged because vibration can gradually shift the lever, causing the brake to be disengaged accidentally.

SUMMARY OF THE INVENTION

The invention reduces difficulties and disadvantages of the prior art by providing a brake actuating system in which actuator means applying braking force to the member to be braked is responsive to actuation of that actuator means, as well as an operator's signal controlling the means. Also, in some embodiments, the device has an enhanced feedback arrangement in which an operator controlling the brake can "feel" application of the braking force. Thus, it is easier for an operator to feel the braking force that is being applied so that he can obtain a desired rate of brake application. Furthermore, in one alternative, means to lock the brake in the engaged position can be incorporated into the braking system with a simple valve, thus alleviating accidental disengagement of the brake due to vibration.

A brake actuating system according to the invention is for use with a brake assembly having a brake body, an extensible and retractable brake actuator having an actuator fluid input means, and at least one friction member cooperating with the actuator and the brake body so as to brake a brakeable member. The brake actuating system has a first fluid valve means having a supply fluid input means, a fluid output means, an exhaust means, and a signal input means. The fluid input means is adapted to receive pressurized fluid under constant pressure. The fluid output means discharges fluid at an output pressure which is adapted to control actuation of the actuator. The exhaust means exhaust fluid. The invention also includes a coupling means which cooperates with the first fluid valve means and an operator's control so as to receive a brake signal from the operator's control. The coupling means also extends between the brake body and means responsive to actuation of the actuator. In this manner, a change of brake signal from the operator causes a corresponding change in extension of the actuator which produces a corresponding change in output signal to the actuator. In a first embodiment, a second fluid valve means is incorporated into the system to be used in applications where the volume of fluid required for actuating the actuators is relatively high. The second fluid valve means has a supply fluid input means adapted to receive pressurized fluid, and a fluid output means adapted to communicate with the actuator fluid input means. The second valve means has a pilot pressure input means which communicates with the fluid output means of the first valve means so that a change in pilot pressure from the output means of the first valve means changes the output from the second valve means and thus also changes the input signal to the brake actuator. In a second embodiment, using an alternative first valve means the fluid output means communicates directly with the actuator fluid input means so that the output signal from the first valve means directly controls the actuator. The second embodiment is applicable where simplicity is an advantage and a lower volume of fluid is to be used than in the first embodiment, permitting elimination of the second valve means. Third and fourth embodiments, using either valve means of the first or second embodiments, provide a more direct feedback of brake application force, thus reducing effects of friction in a mechanical coupling between the brake.

A detailed disclosure following, related to drawings, describes several embodiments of the invention, which invention is capable of expression in structure other than that described and illustrated.

DESCRIPTION OF THE DRAWINGS

FIG. 2 is a simplified fragmented diagram of a second embodiment of the invention using a single valve, FIG. 4 is a simplified fragmented diagram of a fourth embodiment of the invention with enhanced feedback without locking capability.

DETAILED DISCLOSURE

FIG. 1

Figure 1:
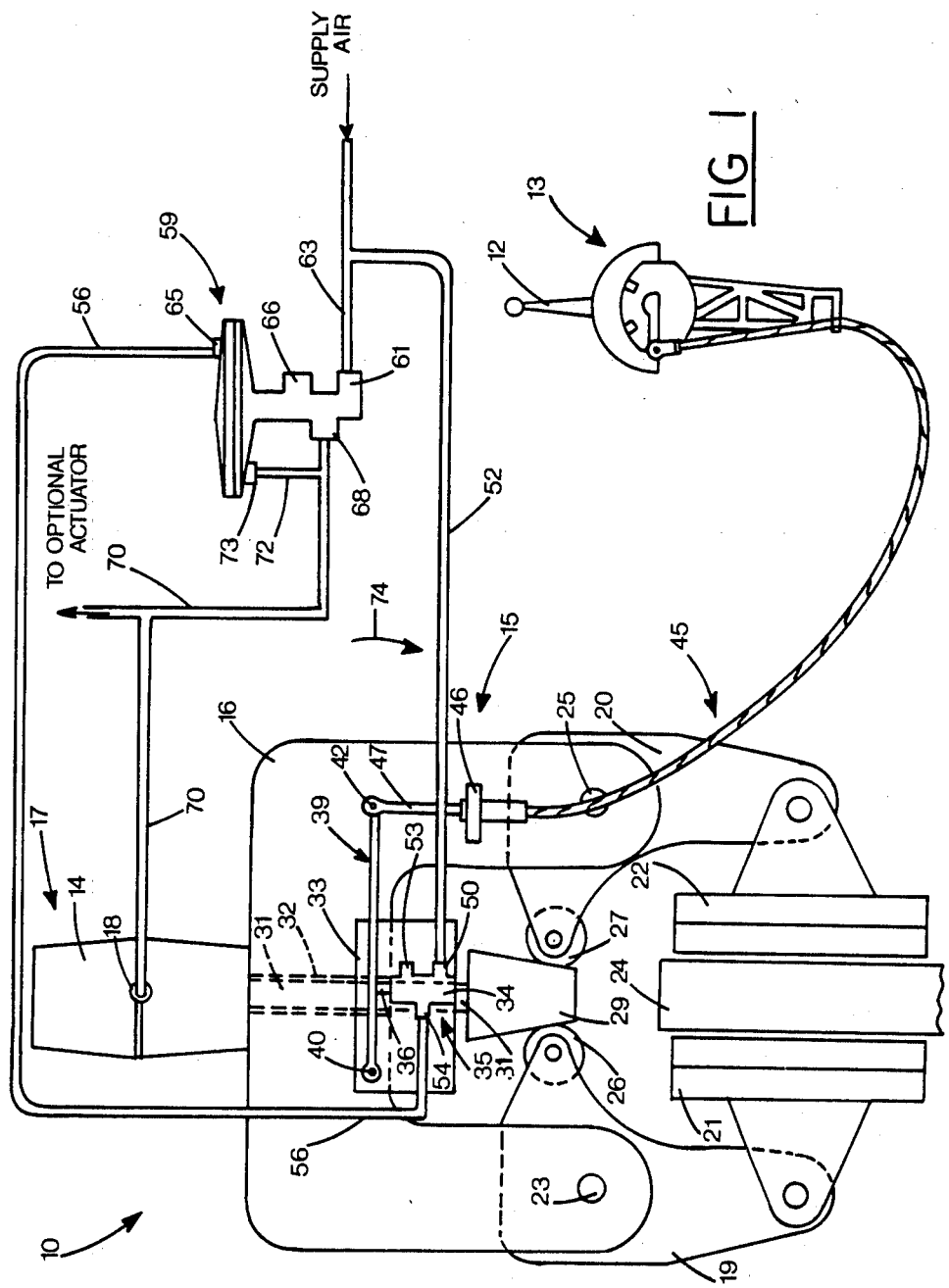
FIG. 1 is a simplified diagram showing a first embodiment of a braking apparatus according to the invention using two valves.

The first embodiment 10 of a fluid actuated braking apparatus according to the invention has a rotatable manual control lever 12 in a control device 13 for controlling a brake assembly 15. The assembly 15 has a brake body 16 and an extensible and retractable brake actuator 17, for example a pneumatic diaphragm type linear actuator. The actuator 17 has an actuator body 14 secured to the body 16 and a fluid input port or means 18. The brake assembly is a caliper type brake having a pair of caliper arms 19 and 20 hinged to the body 16 at pins 23 and 25 respectively, the arms having inner ends carrying brake shoes 21 and 22 respectively to brake a brake disc 24 fitted therebetween. Outer ends of the caliper arms 19 and 20 carry respective rollers 26 and 27 which engage a cam wedge 29 carried at an outer end of an actuator output rod 31 extending from the actuator 17 through a clearance opening 32 in the body. The rod 31 is extensible of the body 14 and extension of the rod 31 from the actuator forces the wedge against the rollers 26 and 27 which move outwardly, causing a correspondingly inward movement of the brake shoes 21 and 22 to brake the disc 24. The brake assembly as above described is old and is selected for the relatively long travel of the actuator and cam to cause brake shoe actuation. Other types of caliper brake assemblies can be selected, for example a transversely mounted floating actuator arrangement as shown in FIG. 2. Alternatively, expanding shoe and drum brake arrangements can be substituted using known mechanically equivalent structure. In all equivalent structures, the brake assembly has a brake body, an extensible and retractable brake actuator having an actuator fluid input means, and at least one friction member cooperating with the actuator and the brake body so as to brake a brakeable member such as a disc, drum or rail.

The brake assembly is actuated by a brake actuating system according to the invention which includes a three-way, pressure-compensating, self-relieving, pneumatic regulator valve 35 which can be termed a first valve means. The valve 35 has a valve body 34 which is secured to a bracket 33 extending from the rod 31 and thus is secured relative to, and moves with, a portion of the actuator. The valve body is thus secured to means responsive to actuation of the actuator. The valve 35 also has a signal or valve input rod 36 extending from the body 34, which rod meters supply air by an amount dependent on rod position, in this instance proportionally to depression of the rod into the body as will be described. The actuator carries an operating lever 39 which has a inner end hinged relative to the output rod 31 at a hinge 40 and extends past the valve 35 so as to contact the input rod 36. The lever 39 has an outer end 42 on a side of the input rod 36 remote from the hinge 40. A push/pull control cable 45 extends between the control device 13 and the valve 35, and has a core 47 which is responsive to rotation of the lever 12. The core 47 has an outer end connected to the outer end 42 of the operating lever 39, and the cable 45 has a sheath secured relative to the control device 13 and to a bracket 46 attached to the brake body so that rotation of the lever 12 actuates the lever 39. Thus, the operating lever 39 is hinged relative to the output rod 31 and is responsive to a brake signal from the operator which swings the lever relative to the output rod. In summary, the first valve means is secured relative to a portion of the actuator and has an input rod adapted to cooperate with the actuator output rod by being responsive to the position of the operating lever to meter the fluid passing through the valve, that is output pressure from the valve is dependent on the rod position. It can be seen that the cable 45 with the core 47, the lever 39 and the bracket 33 and associated connectors serve as a coupling means cooperating with the first valve means and the operator's control. It can be seen that the coupling means has first and second portions in which the first portion includes the lever 39 and the core 47, and the second portion includes the sheath of the cable 45 and various brackets etc. It can be seen that the first portion cooperates with the signal input means of the first valve means and an operator's control so as to receive a brake signal from the operator's control, and the second portion cooperates with the operator's control and the brake body.

The first valve means 35 has a supply fluid input means or input port 50 connected to a supply fluid conduit 52 which is connected to a pressurized fluid supply, not shown, so that the fluid input port is adapted to receive pressurized air at a constant pressure. The valve 35 has an exhaust port 53, and also a fluid output means or port 54 which outputs a varying pressure defined as "pilot pressure". The port 54 is connected to an intermediate fluid conduit 56 which extends to a pressure-compensating, pilot-actuated, pneumatic relay valve 59, which is also known as the second valve means and is described later. When the input rod 36 of the valve means 35 is fully extended, the input port 52 is closed and no air passes through that port. As the rod is depressed, air entering the input port is metered and passes through the output port to provide an output signal at a pressure dependent on rod position. When the rod 36 is stationary, an equilibrium position is attained in which the output pressure is maintained and no flow occurs through the valve due to closing the input and exhaust ports. When the input rod moves out again, the input port is closed and the exhaust port is opened to exhaust air at the exhaust port 53. The input rod 36 has a cross-sectional area ratio such that the rod 36 is subjected to a feedback force which is proportional to output pressure so that the force required to depress the input rod increases proportionally to depression of the actuator rod 31. Thus, the feedback force on the input rod 36 reflects output pressure from the valve means, and this is termed an unbalanced valve. This feedback force is transferred to the operator through the cable core 47, thus providing a feedback of brake signal to the operator, ie. the operator can "feel" the applied force. This is assuming that friction losses in the cable 45 and other connections are negligible when compared with the feedback force.

The valve 59 is a compensating three-way type and has a supply fluid input port or means 61 connected to a supply conduit 63 receiving pressurized air at a constant pressure from the same source as the conduit 52. The valve 59 also has a pilot pressure input port or means 65 connected to the conduit 56 so as to communicate with the fluid output means 54 of the valve 35, the output means 54 outputting the pilot pressure which controls actuation of the valve 59. The valve 59 has an exhaust port 66 to exhaust fluid, and a fluid output port or means 68 connected to an output conduit 70 which extends into the input port 18 of the actuator 17, and, if required, to optional additional actuators of additional brake assemblies, not shown. Thus, the output from the valve 59 is fed directly to the actuator 17 for controlling extension of the output rod 31 of the actuator. A connecting conduit 72 extends from the conduit 70 to a port 73 on the valve 59, the port 73 communicating with a chamber which is defined in part by a face of a valve diaphragm, not shown, which diaphragm has an opposite face exposed to pressure from the pilot input port 65. Thus the valve diaphragm is exposed to pilot input pressure on one side, and output pressure on the other side, and thus is a so-called "balanced" diaphragm. In a balanced or equilibrium condition, pressures on both sides of the diaphragm are equal and the valve 59 is closed, that is the exhaust and input ports 66 and 61 of the valve are closed so that pressure in the output conduit 70 is maintained. In equilibrium, the output pressure from this valve equals the pilot pressure applied to the diaphragm within the valve, ie. the pressure at the pilot pressure input port 65, which of course equals the output pressure from the valve means 35.

OPERATION

The supply input ports 50 and 61 of the valves 35 and 59 receive pressurized fluid and are both closed when there is no brake signal. As the lever 12 is moved from the "off" position, the cable 45 swings the end 42 of the lever 39 in direction of an arrow 74 which depresses the input rod 36 in a generally similar direction. The input rod controls the metering means within the valve 35 which meters fluid fed into the supply fluid input means 50 to vary pressure of the fluid signal leaving the valve 35 through the output port 54 and the conduit 56. Fluid pressure in the line 56, previously defined as pilot pressure, is fed to the input port 65 of the valve 59, which controls fluid entering the input port 61 and leaving by the output port 68 into the conduit 70. Fluid pressure in the conduit 70 is equal to the pilot pressure at the port 65 and is transmitted to the actuator through the actuator fluid input port 18 so as to extend the actuator output rod 31. Extension of the rod 31 swings the caliper arms so that the shoes 21 and 22 move inwardly, and simultaneously with movement of the rod 31, the hinge 40 of the actuating lever 39 and the valve 35 move together. If there is no further change in brake signal from the lever 12, the outer end 42 of the lever 39 will remain stationary and the valve 35 attains its equilibrium condition in which flow ceases due to closure of input and exhaust ports 50 and 53. When the valve 35 is closed, the valve 59 closes shortly thereafter by attaining its equilibrium condition when air pressure in the output conduit equals pilot pressure, which is sensed through the conduit 72. When pressures across the diaphragm in the valve 59 are equalized, the input and exhaust ports 61 and 66 of the valve 59 close and the brake actuator is thus held extended under the influence of the pilot pressure and maintains the brake engaged.

If the lever 12 is swung to reduce braking force, the lever 39 swings in a direction opposite to the arrow 74, and the input rod 36 extends further from the valve means 35. This reduces output pressure by upsetting the equilibrium position and exhausting some air from the conduit 56 through the exhaust port 53. This reduces pilot pressure at the port 65 of the valve means 59, and the equilibrium position of the valve means 59 is upset so that the exhaust port 66 is opened, thus reducing pressure in the line 70 and causing retraction of the output rod 31. Retraction of the rod 31 further depresses the input rod 36, so that the valve means 35 finally attains a new equilibrium position at which a new pilot pressure in the line 56 is maintained by closing the exhaust port 53. The new pilot pressure is relayed to the line 70 and maintained by closing the exhaust port 56 of the valve means 59.

In summary, it can be seen that a change of brake signal from the operator causes a corresponding change in extension of the actuator which produces a corresponding change in fluid output signal to the actuator. In effect, the change in input signal to the valve 35, due to swinging of the lever 39 about the hinge 40 results in a change in pilot pressure from the first valve means, which changes the output from the second valve means 59 and thus also changes the input signal to the brake actuator.

ALTERNATIVES AND EQUIVALENTS

As previously stated, the invention is shown for use with a caliper brake having wedge actuated caliper arms. This is preferred for some arrangements as it provides a relatively long actuator rod travel for brake actuation, contrasting with the caliper brake arrangement shown in FIG. 2 with a transversely mounted actuator. While caliper brakes are usually preferred for ease of access and braking efficiency, the invention has equivalent usage in expanding shoe drum brakes. The use of a compensating relay valve controlled by a regulator valve is preferred when the actuator requires a relatively large volume of air which cannot be easily controlled by the valve mounted in the actuator output rod. With this combination, several brake actuators can be "tee-ed in" to the line 70 so that several braking assemblies controlling one shaft can be actuated simultaneously, while using only one valve responsive to actuator rod extension of one brake assembly. Also, while the structure is shown for use with pneumatic valve components, clearly other fluid actuated components, such as hydraulic fluid devices, can be substituted with suitable changes in valves and actuators as required.

FIG. 2

A second embodiment 79 of the invention is for use where a relatively low air consumption can be tolerated, and sufficient actuator stroke is available for valve actuation. An alternative brake assembly 80 has a brake body 82, a pair of caliper arms 83 and 84 hinged for rotation relative to the body 82 at pins 81, and carrying respective brake shoes 85 and 86 at inner ends of the arms as shown so as to brake a brake disc 87 therebetween. An extensible and retractable brake actuator 89 has an actuator body 88 having a mounting bracket 90 hinged to an outer end of the caliper arm 83, and an extensible and retractable actuator output rod 91 hinged to an outer end of the arm 84. The above describes a relatively conventional floating actuator caliper brake which differs from the fixed actuator of FIG. 1 and also is modified so as to be within the principle of the invention as follows.

A three-way, pneumatic valve 94 or alternative first valve means has a valve body 95 secured adjacent the outer end of the arm 84 so as to be movable with the arm 84. The valve 94 has a supply fluid input means or port 96 adapted to receive pressurized fluid at a constant pressure from a supply conduit 98, an exhaust port 99 and a fluid output means or output port 100 feeding into an output conduit 102. The conduit 102 communicates with an actuator fluid input means 105 in the body 88 so as to control extension of the actuator rod 91. The valve 94 has a signal input means or rod 107 which is slidable axially of the valve body so as to control fluid directing means, such as a valve spool, within the valve between open and closed positions as follows. In the open position, the input and output ports are open and interconnected, the exhaust port 99 is closed and fluid leaves the valve means 94 through the output port 100. In the closed position, the input port 96 is closed, the exhaust and output ports 99 and 100 are open and interconnected and air at the output port leaves the valve 94 through the exhaust port. In a balanced intermediate position between the open and closed positions the input and exhaust ports are closed so that pressure at the output port 100 is maintained, ie. flow through the valve is stopped. Therefore, the first valve means 94 of FIG. 2 differs from the first valve means 35 of FIG. 1 primarily by eliminating the deliberate proportional metering function of the valve means 35, but other functions of the two valve means are similar.

A push/pull control cable 109 has a core 111 having one end connected to the input rod 107 and an adjacent portion of a sheath 112 connected to the brake body 82 by brackets 113. The push/pull control cable 109 has an opposite end extending to a control device, not shown, similar to the device 13 of FIG. 1. Thus, in contrast to the embodiment of FIG. 1, the operating lever 39 of FIG. 1 is eliminated and the cable is connected directly to the first valve means so as to be responsive to a signal from an operator which moves the valve input rod relative to the valve body. Thus the alternative first valve means in this embodiment is secured relative to structure associated with, or can be secured directly to, the actuator rod, and has a signal input rod which is responsive to a signal from the operator through the cable 109, or to relative movement between the caliper arm 84 carrying the valve 59 and the brake body 82. It can be seen that the relay valve 59 of FIG. 1 has been eliminated and the first valve output means now communicates directly with the actuator fluid input means.

In operation, pressurized air at constant pressure is fed to the conduit 98 and passes into the input port 96 of the valve, which is closed when there is no brake signal. Transmission of a brake signal by the push/pull control cable 109, for example extension of the core 111 of the cable in direction of an arrow 117 to depress the signal input rod 117, increases braking force by discharging air under pressure from the output port 100 of the valve 94 which produces a corresponding increase in the pressure to the actuator 89. The increase in actuator pressure produces a corresponding extension of the actuator output rod 91, which simultaneously moves the arm 84. The valve 96 moves with the arm 84 so as to decrease depression of the signal input rod 107, thus eventually attaining the intermediate balanced position of the valve 94 in which the input and exhaust ports 96 and 99 are closed to maintain the existing pressure in the actuator. Clearly the signal input rod or means is responsive to extension of the actuator, and the actuator remains extended to hold the brake engaged until there is a change in brake signal or movement of the brake shoes.

If the signal to the control cable 109 is now reversed, the input rod 107 is made to extend further from the valve 94, thus opening the exhaust port 99 to bleed air to exhaust while maintaining the input port closed, which reduces output pressure through the conduit 102. This bleeding produces a corresponding reduction in pressure in the actuator and causes a retraction of the actuator output rod 91, which simultaneously moves the valve in a direction opposite to the arrow 117, thus attaining a new intermediate balanced position of the input rod with a reduced actuator pressure. Also, similarly to the FIG. 1 embodiment, if friction losses in the control system and equivalent coupling means are low, "feel" of the braking force is transferred to the operator.

Clearly, in both embodiments, the strokes of the actuator rod and the first valve means, and the corresponding movement of structure carrying the first valve means and the stroke of the control cable are selected so that sufficient movement of the valve is available for actuation following feedback response of the brake assembly. Also it can be seen that in both embodiments the input rod of the first valve means cooperates with structure responsive to the output rod of the brake actuator. Also, in the FIG. 2 embodiment, an operating lever could be hinged to the caliper arm 84 to cooperate with the input rod 107 and eliminate the direct connection with the control cable 109, in a manner similar to the lever 39 of FIG. 1. Similarly, the lever 109 of FIG. 1 could be eliminated to provide the direct connection as in FIG. 2. Equivalent control connection means, moving relative to the brake body, can be substituted for the lever or control cable as illustrated. Also the valve means of the assemblies 15 and 80 can be interchanged so that the assembly 80 could be fitted with first and second valve means equivalent to the valve means 35 and 59 of FIG. 1, and the assembly 15 could be fitted with a first valve means only equivalent to the valve means 94 of FIG. 2. In both embodiments it can be seen that the first portion of the coupling means cooperates with the signal input means and an operator's control so as to receive a brake signal from the operator's control, and the second portion cooperates with the operator's control and the brake body.

FIG. 3

A third embodiment of the invention is for use where there is excessive friction in the push-pull cable, or other means interconnecting the control device with the first valve means, or where a particularly sensitive feel of braking force is required. The third embodiment, which is shown in a brake applied condition, can be used with the braking apparatus of either FIG. 1 or FIG. 2, or other types wherein a brake actuator is actuated by fluid pressure, which pressure reflects braking force which is to be transmitted to a manually operated control handle.

The third embodiment 120 of the invention has a brake assembly 122 having a brake body 123 and a pair of caliper arms 124 and 125 hinged for rotation relative to the body and carrying respective brake shoes 126 and 127 at inner ends of the arms as shown so as to brake a brake disc 129 therebetween. A brake actuator 131 has an actuator body 132 having an input port 134 to receive pressurized brake fluid, and an actuator output rod 136 carrying a cam or wedge 137 which cooperates with rollers 139 and 140 carried at outer ends of the caliper arms 124 and 125 respectively. An operating lever 143 has an inner end 144 hinged to a bracket 145 mounted on the output rod, and an outer end 147 cooperating with a core of a push-pull control cable 149. The above assembly 122 is similar to that shown for the brake assembly 15 of FIG. 1. A three-way pneumatic valve 152, which can be identical to the valve 94 of FIG. 2 and serves as a first valve means, has a valve body 153 secured to the bracket 145 and an input rod 155 extending from the body so as to control fluid flow through the valve. The input rod cooperates with the lever 143 in a manner similar to cooperation between the rod 36 and the lever 39 as described with reference to FIG. 1. The valve 152 has an input port 157 to receive pressurized fluid at a constant pressure from a supply line 158, a fluid output port 160, and an exhaust port 161. An output fluid conduit 163 extends between the output port 160 and the input port 134 of the actuator to control actuation of the actuator. The input rod 155 controls flow directing means within the valve 152 between the input, output, and exhaust ports 157, 160 and 161, and, similarly to the valve 94 of FIG. 2, in a balanced intermediate position all flow through the valve is stopped. It can be seen that the assembly 122 as described above shows adaptation of a fluid circuit similar to that used on the embodiment of FIG. 2, incorporated with a brake assembly as shown in FIG. 1.

The third embodiment differs from previously described embodiments by providing a more positive "feel" of braking force or enhanced feedback so as to reduce adverse effects of friction in the push-pull cable 149 that can occur if the cable is excessively long or has an excessive number of tight curves. A control device 165 has a manual control lever 166 hinged for rotation about a fulcrum 167 as shown. An outer end 169 of the core of the control cable 149 is pinned to the lever 166 so that swinging the lever per arrow 171 shifts the core relative to the control cable so as to control movement of the rod 151 of the valve 152. A lever cylinder 172 has a piston 173, broken outline, connected by a piston rod 174 to the control lever 166, the piston serving as a partition to divide the cylinder into feedback and lock-up chambers 176 and 177 respectively. A mode selector valve 180 is controlled by a valve handle 181 and is a four-way, three-position directional valve having an input port 182, first and second outlet ports 184 and 185 and an exhaust port 186 which vents to atmosphere. First and second conduits 189 and 190 connect the first and second selector valve outlet ports 184 and 185 with the feedback and lock-up chambers respectively through undesignated cylinder ports as shown. A feedback fluid conduit 192 extends from the input port 182 of the selector valve 180 to communicate with the input port 134 of the actuator so that the valve 180 is fed with fluid at the same pressure as that in the actuator 131.

The valve 180 functions during operation of the brake as follows. When the valve handle 181 is in a central position as shown, the feedback conduit 192 is closed at the valve, and the ports 184 and 185 are opened to atmosphere so that there is no restriction to movement of the piston 173 within the lever cylinder 172. When the handle 181 is in a first position 181.1 as shown, the ports 182 and 184 are interconnected and the first conduit 189 and feedback chamber 176 are exposed to fluid pressure within the actuator 131 so that force on the partition or piston 173 is applied to the lever 166 in opposition to force from the operator. It can be seen that, as pressure within the actuator 131 rises, force on the piston 173 correspondingly rises. The operator is aware of this increase in force because the force is applied to the lever 166 in a direction opposite to his application of force for increasing the pressure within the actuator. When the handle 181 is in a second position 181.2 as shown, the ports 182 and 185 are interconnected and the second conduit 190 and lock-up chamber 177 are exposed to fluid pressure within the actuator, which acts on the lever 166 in the same direction as the operator's force to increase braking force, and thus prevents unintentional movement of the lever 166 in a direction to decrease braking force. Thus the second position 181.2 of the lever 181 is a lock-up position which essentially prevents accidental "backing-off" of the braking force due to "creep" of the lever 166, which might otherwise occur, particularly in installations subjected to vibration.

Thus, in the third embodiment, if the valve handle is in the first position 181.1, the operator experiences directly on the manual lever 166 a force reflecting pressure in the actuator, which directly reflects braking force. Thus, excessive friction in the push-pull control cable 149 would have a negligible effect on this feedback force, which contrasts with the feedback arrangement shown in the embodiments of FIGS. 1 and 2. Alternatively, if the valve handle 181 is put in the second position 181.2, the handle 166 is essentially prevented from accidentally moving to disengage the brake by fluid locked within the chamber 177.

FIG. 4

Figure 3:
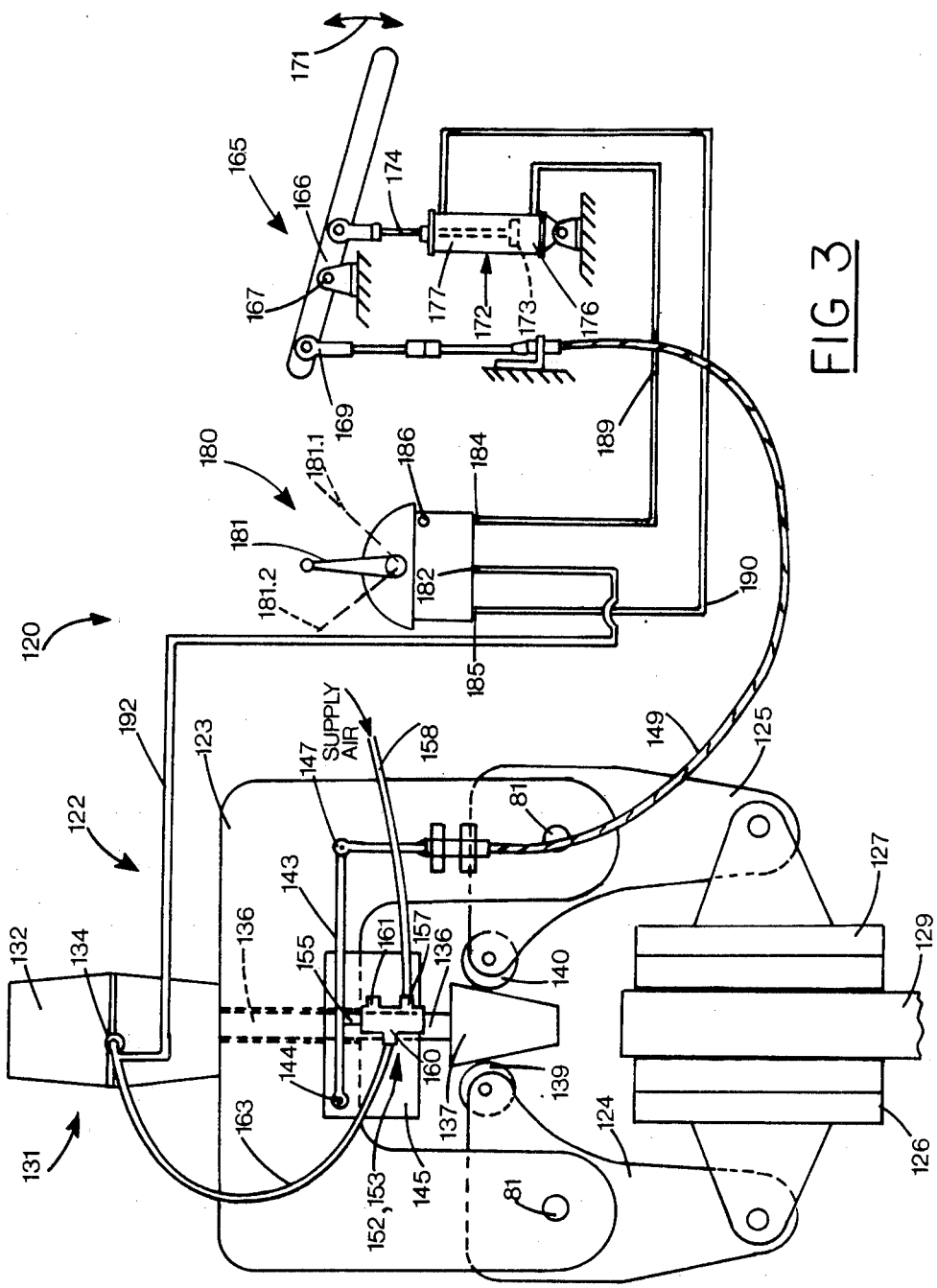
FIG. 3 is a simplified fragmented diagram of a third embodiment of the invention showing an enhanced braking force feedback means with locking capability.

A fourth embodiment 195 of a braking system according to the invention has a brake assembly 196 which is generally similar to the brake assembly 172 of FIG. 3, with an associated three-way pneumatic valve 198, which can be identical to the valve 152 of FIG. 3 and which is controlled by an operating lever 199 coupled to one end of a push-pull control cable 200. The valve is thus the first valve means and, together with the brake assembly 196, functions as previously described. A manual control lever 202 cooperates with the opposite end of the cable 200 and is hinged for rotation about a fulcrum 203. A lever cylinder 205 has a piston rod 206 coupled to a partition or piston 208 which is movable within the cylinder 205 and defines a feedback chamber 209 which communicates through a port at one end of the cylinder with a feedback fluid connection 210 which extends to an input port 212 of an actuator 213 of the brake assembly. Thus, similarly to the FIG. 3 embodiment, the manual control lever 202 cooperates with a control connection means which extends to the signal input rod of the valve 198. The lever cylinder 205 provides an expandable and contractable feedback chamber 209 having an output, that is the piston rod 206, cooperating with the control lever. The feedback fluid connection 210 communicates with the fluid pressure within the actuator and the feedback chamber so that the feedback chamber output applies to the control lever a force reflecting fluid pressure at the actuator in opposition to force from the operator, thus providing a positive feel or feedback of braking force for the operator. When compared with FIG. 3, it can be seen that the fourth embodiment of FIG. 4 eliminates the mode selector valve 180 and the lock-up provision in the air cylinder. Thus it is relatively simple, and yet provides the feature of positive feedback and has the other advantages found in the first and second embodiments of the invention.

The embodiments 120 and 195 of FIGS. 3 and 4 are shown with three-way valves 152 and 198 respectively, which valves are similar to the valve 94 of FIG. 2. Alternatively, the valves 152 and 198 can be eliminated and regulating valve, controlling a pilot-actuated relay valve similar to the valves 35 and 59 of FIG. 1 can be substituted. Equivalent coupling means are also used in the embodiments 120 and 195.

I claim:

1. A brake actuating system for use with a brake assembly, the brake assembly having: a brake body, an extensible and retractable brake actuator having an actuator fluid input means, and at least one friction member cooperating with the actuator and the brake body so as to brake a brakeable member, the brake actuating system having:
   (a) a first fluid valve means having: a valve body secured to a means responsive to actuation of the actuator; a supply fluid input means adapted to receive pressurized supply fluid; a signal input means movable relative to the body to control the supply fluid passing through the valve, an exhaust means to exhaust the fluid; and a fluid output means to discharge fluid at an output pressure which is controlled by the signal input means, (b) a coupling means having first and second portions, the first portion cooperating with the signal input means of the first fluid valve means and an operator's control, and the second portion cooperating with the operator's control and the brake body, so that a change in brake signal from the operator's control causes a corresponding change in extension of the actuator which produces a corresponding change in output signal to the actuator.

2. A brake actuating system as claimed in claim 1 in which the first valve means is characterized in that:
(a) the signal input means is a valve input rod which controls a metering means within the valve means which meters the fluid fed into the supply fluid input means by an amount dependent on rod position, so as to vary the output pressure of the fluid signal at the fluid output means, the input rod being subjected to a feedback force which is proportional to the output pressure,
(b) the coupling means similarly being subjected to the feedback force which can be fed to the operator to provide an indication of braking force.

3. A brake actuating system as claimed in claim 2, in which
(a) the output pressure from the fluid output means generates a pilot pressure signal, (b) and the system further includes a second fluid valve means having a supply fluid input means adapted to receive pressurized fluid under a constant pressure, a fluid output means adapted to communicate with the actuator fluid input means, and a pilot pressure input means communicating with the fluid output means of the first valve means to receive the pilot pressure signal,
such that a change in pilot pressure signal from the output means of the first valve means changes the output from the second valve means and thus also changes the input signal to the brake actuator.

4. A brake actuating system as claimed in claim 3 in which:
(a) the first valve means is a three-way, pressure-compensating, unbalanced, regulator valve,
(b) the second valve means is a three-way, pilot-actuated relay valve.

5. A brake actuating system as claimed in claim 1 in which the first valve means is characterized in that:
(a) the signal input means is a valve input rod which controls a fluid directing means within the valve.

6. A brake actuating system as claimed in claim 5 in which:
(a) the first valve means is a three-way pneumatic valve having: an open position in which the input and output means are open and interconnected, and the exhaust means is closed; a closed position in which the output and exhaust means are open and interconnected and the input means is closed, and a balanced intermediate position in which flow through the valve is stopped.

7. A brake actuating system as claimed in claim 1 in which:
(a) the signal input means is adapted to cooperate with the coupling means which is responsive to an output rod of the brake actuator.

8. A brake actuating system as claimed in claim 1 in which:
(a) the actuator has an actuator output rod and an actuator body, the output rod being extensible and retractable of the actuator body and the actuator body being secured to the brake body,
(b) the coupling means includes an operating lever hinged relative to the output rod and being responsive to a signal from the operator's control which swings the lever relative to the output rod,
(c) the first valve means has a valve body secured relative to the actuator output rod, and the signal input means is an input rod moveable of the valve body and being responsive to the position of the operating lever to meter a fluid passing through the valve means.

9. An apparatus as claimed in claim 1 in which:
(a) the signal input means of the first fluid valve means is subjected to a feedback force which reflects output pressure from the valve means,
(b) the coupling means cooperates with the signal input means to transmit the feedback force to the operator's control.

10. An apparatus as claimed in claim 1 in which:
(a) the means responsive to actuation of the actuator is an actuator output rod.

11. A fluid actuated braking apparatus having:
(a) a brake assembly having a brake body, an extensible and retractable brake actuator having an actuator fluid input means, and at least one friction member cooperating with the actuator and a brake body so as to brake a brakeable member,
(b) a brake actuating system having a first valve means having: a valve body secured to a means responsive to actuation of the actuator; a supply fluid input means adapted to receive pressurized supply fluid; a signal input means movable relative to the body to control the supply fluid passing through the valve; an exhaust means to exhaust the fluid; and a fluid output means to discharge the fluid at an output pressure which is controlled by the signal input means,
(c) a coupling means having first and second portions, the first portion cooperating with the signal input means of the first fluid valve means and an operator's control so as to receive a brake signal from the operator's control, and the second portion cooperating with the operator's control and the brake body,
so that a change in brake signal from the operator's control causes a corresponding change in extension of the actuator which produces a corresponding change in output signal to the actuator.

12. A fluid actuated braking apparatus as claimed in claim 11, in which:
(a) the output pressure from the fluid output means generates a pilot pressure signal,
(b) and the system further includes a second fluid valve means having a supply fluid input means adapted to receive pressurized fluid under a constant pressure, a fluid output means adapted to communicate with the actuator fluid input means, and a pilot pressure input means communicating with the fluid output means of the first valve means to receive the pilot pressure signal,
such that a change in pilot pressure signal from the output means of the first valve means changes the output from the second valve means and thus also changes the input signal to the brake actuator.

13. A fluid actuated braking apparatus as claimed in claim 12 in which:

(a) the signal input means is a valve input rod which controls a metering means within the valve means which meters the fluid fed into the supply fluid input means by an amount dependent on rod position, so as to vary the output pressure of fluid signal at the fluid output means, the input rod being subjected to a feedback force which is proportional to the output pressure, (b) the coupling means similarly being subjected to the feedback force which can be fed to the operator to provide an indication of braking force, (c) the first valve means is a three-way, pressure-compensating, self-relieving, unbalanced regulator valve, (d) the second valve means is a three-way, pilot-actuated relay valve.

14. An apparatus as claimed in claim 11 in which:

(a) the signal input means of the first fluid valve means being subjected to a feedback force which reflects output pressure from the valve means, (b) the coupling means cooperates with the signal input means to transmit the feedback force to the operator's control.

15. An apparatus as claimed in claim 11 in which:

(a) the means responsive to actuation of the actuator is an actuator output rod.

* * * * *